(12) United States Patent
Finn et al.

(10) Patent No.: US 8,233,005 B2
(45) Date of Patent: Jul. 31, 2012

(54) OBJECT SIZE MODIFICATIONS BASED ON AVATAR DISTANCE

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 12/108,987

(22) Filed: Apr. 24, 2008

(65) Prior Publication Data

US 2009/0271422 A1    Oct. 29, 2009

(51) Int. Cl.
*G09G 5/00* (2006.01)
(52) U.S. Cl. ........................................ 345/581; 345/419
(58) Field of Classification Search .................. 345/419, 345/428, 581; 463/1–47
See application file for complete search history.

(56) References Cited

U.S. PATENT DOCUMENTS

| | | | |
|---|---|---|---|
| 6,023,270 A | 2/2000 | Brush, II et al. |
| 6,036,601 A | 3/2000 | Heckel |
| 6,394,301 B1 | 5/2002 | Koch |
| 6,421,047 B1 | 7/2002 | de Groot |
| 6,532,007 B1 | 3/2003 | Matsuda |
| 6,749,510 B2 | 6/2004 | Giobbi |
| 6,788,946 B2 | 9/2004 | Winchell et al. |
| 6,798,407 B1 | 9/2004 | Benman |
| 6,868,389 B1 | 3/2005 | Wilkins et al. |
| 6,895,406 B2 | 5/2005 | Fables et al. |
| 6,954,728 B1 | 10/2005 | Kusumoto et al. |
| 6,981,220 B2 * | 12/2005 | Matsuda ........................ 715/706 |
| 7,025,675 B2 | 4/2006 | Fogel et al. |
| 7,158,135 B2 | 1/2007 | Santodomingo et al. |
| 7,305,691 B2 | 12/2007 | Cristofalo |
| 7,320,031 B2 | 1/2008 | Konig et al. |
| 7,454,065 B2 | 11/2008 | Satoh |
| 7,479,967 B2 | 1/2009 | Bachelder et al. |
| 7,685,204 B2 | 3/2010 | Rogers |
| 7,720,835 B2 | 5/2010 | Ward et al. |
| 7,805,680 B2 | 9/2010 | Meyers et al. |
| 7,822,687 B2 | 10/2010 | Brillon et al. |
| 8,001,161 B2 | 8/2011 | Finn et al. |
| 2002/0024532 A1 | 2/2002 | Fables et al. |

(Continued)

OTHER PUBLICATIONS

Avatar-Based Marketing: The Avatar-Based Panel (Part One of Five), New World Notes, http://nwn.blogs.com/nwn/2006/06/avatarbased__.mar.html, accessed Nov. 10, 2011, 15 pages.

(Continued)

*Primary Examiner* — Xiao M. Wu
*Assistant Examiner* — Scott E Sonners
(74) *Attorney, Agent, or Firm* — Yee & Associates, P.C.; Mark C. Vallone

(57) ABSTRACT

A computer implemented method, apparatus, and computer program product for modifying objects. In one embodiment, tracking data is obtained which identifies a location of a set of avatars in relation to a range of the object. The range of the object includes a viewable field. In response to determining that the object requires modification, a size of the object is compared with a set of size constraints to form a comparison. Thereafter, the size of the object is modified based on the comparison to form a set of size modifications.

16 Claims, 12 Drawing Sheets

U.S. PATENT DOCUMENTS

| | | | |
|---|---|---|---|
| 2002/0056091 A1 | 5/2002 | Bala et al. | |
| 2002/0107072 A1 | 8/2002 | Giobbi | |
| 2002/0113809 A1* | 8/2002 | Akazawa et al. | 345/706 |
| 2002/0169644 A1 | 11/2002 | Greene | |
| 2003/0004774 A1 | 1/2003 | Greene et al. | |
| 2004/0034561 A1 | 2/2004 | Smith | |
| 2004/0053690 A1 | 3/2004 | Fogel et al. | |
| 2004/0166935 A1 | 8/2004 | Gavin et al. | |
| 2004/0210634 A1 | 10/2004 | Ferrer et al. | |
| 2004/0220850 A1 | 11/2004 | Ferrer et al. | |
| 2005/0071306 A1 | 3/2005 | Kruszewski et al. | |
| 2005/0086112 A1 | 4/2005 | Shkedi | |
| 2005/0086605 A1 | 4/2005 | Ferrer et al. | |
| 2005/0114198 A1 | 5/2005 | Koningstein et al. | |
| 2005/0156928 A1 | 7/2005 | Santodomingo et al. | |
| 2005/0179685 A1 | 8/2005 | Kake et al. | |
| 2005/0253872 A1 | 11/2005 | Goss et al. | |
| 2005/0286769 A1 | 12/2005 | Satoh | |
| 2006/0168143 A1 | 7/2006 | Moetteli | |
| 2006/0194632 A1 | 8/2006 | Hendrickson et al. | |
| 2006/0195462 A1 | 8/2006 | Rogers | |
| 2006/0258462 A1 | 11/2006 | Cheng et al. | |
| 2007/0035561 A1 | 2/2007 | Bachelder et al. | |
| 2007/0043616 A1 | 2/2007 | Kutaragi et al. | |
| 2007/0191104 A1 | 8/2007 | Van Luchene | |
| 2007/0247979 A1 | 10/2007 | Brillon et al. | |
| 2007/0252841 A1 | 11/2007 | Kim | |
| 2007/0261109 A1 | 11/2007 | Renaud et al. | |
| 2008/0004119 A1 | 1/2008 | Van Luchene et al. | |
| 2008/0252716 A1 | 10/2008 | Kano et al. | |
| 2008/0281622 A1 | 11/2008 | Hoal | |
| 2009/0063168 A1 | 3/2009 | Finn et al. | |
| 2009/0089157 A1 | 4/2009 | Narayanan | |
| 2009/0227368 A1 | 9/2009 | Wyatt | |
| 2009/0254417 A1 | 10/2009 | Beilby et al. | |
| 2009/0267937 A1 | 10/2009 | Finn et al. | |
| 2009/0267948 A1 | 10/2009 | Finn et al. | |
| 2009/0267950 A1 | 10/2009 | Finn et al. | |
| 2009/0267960 A1 | 10/2009 | Finn et al. | |
| 2009/0299960 A1 | 12/2009 | Lineberger | |
| 2009/0327219 A1 | 12/2009 | Finn et al. | |
| 2010/0001993 A1 | 1/2010 | Finn et al. | |
| 2010/0005423 A1 | 1/2010 | Finn et al. | |
| 2010/0177117 A1 | 7/2010 | Finn et al. | |
| 2010/0205179 A1 | 8/2010 | Carson et al. | |

OTHER PUBLICATIONS

Avatar-Based Marketing: The Avatar-Based Panel (Part Two of Five), New World Notes, http://nwn.blogs.com/nwn/2006/06/avatarbased_mar.html, accessed Nov. 10, 2011, 6 pages.

Avatar-Based Marketing: The Avatar-Based Panel (Part Three of Five), New World Notes, http://nwn.blogs.com/nwn/2006/06/avatarbased_mar.html, accessed Nov. 10, 2011, 6 pages.

Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.

Avatar-Based Marketing: The Avatar-Based Panel (Part One of Five), New World Notes, http://nwn.blogs.com/nwn/2006/06/avatarbased_mar.html, accessed Nov. 10, 2011, 6 pages.

Hughes, "Those custom Reeboks and the next party," Eightbar, http://eightbar.co.uk/2006/10/11/those-custom-reeboks-and-the-next-party, accessed Oct. 11, 2006, 5 pages.

Hughes, "Planes, trains and automobiles, here come Nissan," Eightbar, http://eightbar.co.uk/2006/10/24/planes-trains-and-automobiles-here-come-nissan, Oct. 24, 2006, 3 pages.

Hughes, "The Sony BMG media island, it is very good," Eightbar, http://eightbar.co.uk/2006/10/19/the-sony-bmg-media-island-it-is-very-good, Oct. 19, 2006, 8 pages.

Hughes, "Ben Folds in Second Life the Event," Eightbar, http://eightbar.co.uk/2006/10/20/ben-folds-in-second-life-the-event, Oct. 20, 2006, 3 pages.

Reynolds, "Virtual Worlds introduction presentation," Eightbar, http://eightbar.co.uk/2006/08/17/virtual-worlds-introduction-presentation, Aug. 17, 2006, 8 pages.

"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.

"Trap," NWN Wikia, http://web.archive.org/web/20071112084836/http://nwn.wikia.com/wiki/Trap, accessed Sep. 14, 2011, 3 pages.

"Unseen," WOW Wiki, http://web.archive.org/web/20070207113119/http://www.wowwiki.com/Unseen, accessed Sep. 14, 2011, 2 pages.

USPTO Office Action regarding U.S. Appl. No. 11/846,724, dated Oct. 27, 2010.

USPTO Final Office Action regarding U.S. Appl. No. 11/846,724, dated Feb. 4, 2011.

USPTO Office Action regarding U.S. Appl. No. 12/108,925, dated Sep. 9, 2011.

USPTO Office Action regarding U.S. Appl. No. 12/108,968, dated Oct. 28, 2011.

USPTO Supplemental Notice of Allowance regarding U.S. Appl. No. 12/109,023, dated May 13, 2011.

USPTO Office Action regarding U.S. Appl. No. 12/165,922, dated Nov. 10, 2011.

USPTO Final Office Action regarding U.S. Appl. No. 12/168,657, dated Oct. 4, 2011.

USPTO Office Action for U.S. Appl. No. 12/109,040 dated Feb. 3, 2011.

PTO office Action for U.S. Appl. No. 12/109,040 dated Jul. 15, 2011.

Kiss et al., "Viewpoint Adaptation During Navigation Based on Stimuli from the Virtual Environment" Web3D 03' Proceedings of the Eighth International Conference on 3D Web Technology, ACM, New York, NY, 2003, p. 23.

USPTO office action for U.S. Appl. No. 12/109,023 dated Dec. 1, 2010.

U.S. Appl. No. 12/108,925, filed Apr. 24, 2008, Finn et al.
U.S. Appl. No. 12/108,968, filed Apr. 24, 2008, Finn et al.
U.S. Appl. No. 12/109,010, filed Apr. 24, 2008, Finn et al.
U.S. Appl. No. 12/165,922, filed Jul. 1, 2008, Finn et al.
U.S. Appl. No. 12/109,023, filed Apr. 24, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.

USPTO Office Action dated Aug. 24, 2011 for U.S. Appl. No. 12/353,656.

USPTO office action for U.S. Appl. No. 12/168,657 dated Apr. 26, 2011.

USPTO notice of allowance for U.S. Appl. No. 12/109,023 dated Apr. 13, 2011.

Gladestrider, "ZAM Everquest Classes: The Ranger—Tracking-Help," http://everquest.allakhazam.com/db/classes.html?=10&mid=1098807428716491276, dated Oct. 26, 2004, 2 pages.

Riddikulus, "Dungeons and Dragons Online Eberron Unlimited Forums: Repeating quests-limit?" http://forums.ddo.com/showthread.php?t=123676, dated Oct. 8, 2007, 6 pages.

USPTO Notice of Allowance regarding U.S. Appl. No. 12/108,925, dated Dec. 29, 2011, 18 pages.

USPTO Office Action regarding U.S. Appl. No. 12/109,010, dated Jan. 30, 2012, 43 pages.

USPTO Final Office Action regarding U.S. Appl. No. 12/353,656, dated Dec. 23, 2011, 47 pages.

* cited by examiner

OBJECT BASED AVATAR TABLE 1300

| RENDERING UUID = PRIMARY KEY | |
|---|---|
| 1302 OBJECT A UUID | AVATAR A UUID — 1304 |
| | AVATAR A ZONE 1 ENTER TIME — 1306 |
| | AVATAR A ZONE 2 ENTER TIME — 1308 |
| | AVATAR A ZONE 1 LEAVE TIME — 1310 |
| | AVATAR A ZONE 2 LEAVE TIME — 1312 |
| 1320 OBJECT B UUID | AVATAR A UUID — 1322 |
| | AVATAR A ZONE 1 ENTER TIME — 1324 |
| | AVATAR A ZONE 2 ENTER TIME — 1326 |
| | AVATAR A ZONE 1 LEAVE TIME — 1328 |
| | AVATAR A ZONE 2 LEAVE TIME — 1330 |
| | AVATAR C UUID — 1332 |
| | AVATAR C ZONE 1 ENTER TIME — 1334 |
| | AVATAR C ZONE 2 ENTER TIME — 1336 |
| | AVATAR C ZONE 1 LEAVE TIME — 1338 |
| | AVATAR C ZONE 2 LEAVE TIME — 1340 |

OBJECT SIZE MODIFICATIONS BASED ON AVATAR DISTANCE

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for modifying an object size for presentation to a set of avatars.

2. Description of the Related Art

A virtual universe (VU), also referred to as a metaverse or "3D Internet", is a computer-based simulated environment. Examples of virtual universes include Second Life®, Entropia Universe, The Sims Online®, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

The viewable field is the field of view for a particular user. The viewable field for a particular user may include objects, as well as avatars belonging to other users. The viewable field is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. An object is an element in a virtual universe that does not represent a user. An object may be, for example, buildings, statues, billboards, signs, and advertisements in the virtual universe. However, objects in a particular user's viewable field may be difficult or impossible to discern because of the manner in which the object is presented to a user. For example, words on a sign posted in a virtual universe may be too large or too small to read.

SUMMARY OF THE INVENTION

The illustrative embodiments provide a computer implemented method, apparatus, and computer usable program code for modifying object sizes in a virtual universe. In one embodiment, tracking data is obtained which identifies a location of a set of avatars in relation to a range of the object. The range of the object includes a viewable field. In response to determining that the object requires modification, a size of the object is compared with a set of size constraints to form a comparison. Thereafter, the size of the object is modified based on the comparison to form a set of size modifications.

BRIEF DESCRIPTION OF THE DRAWINGS

FIG. 13 is a block diagram of a set of clones presented to a set of avatars in accordance with an illustrative embodiment;

DETAILED DESCRIPTION OF THE PREFERRED EMBODIMENT

Figure 1:
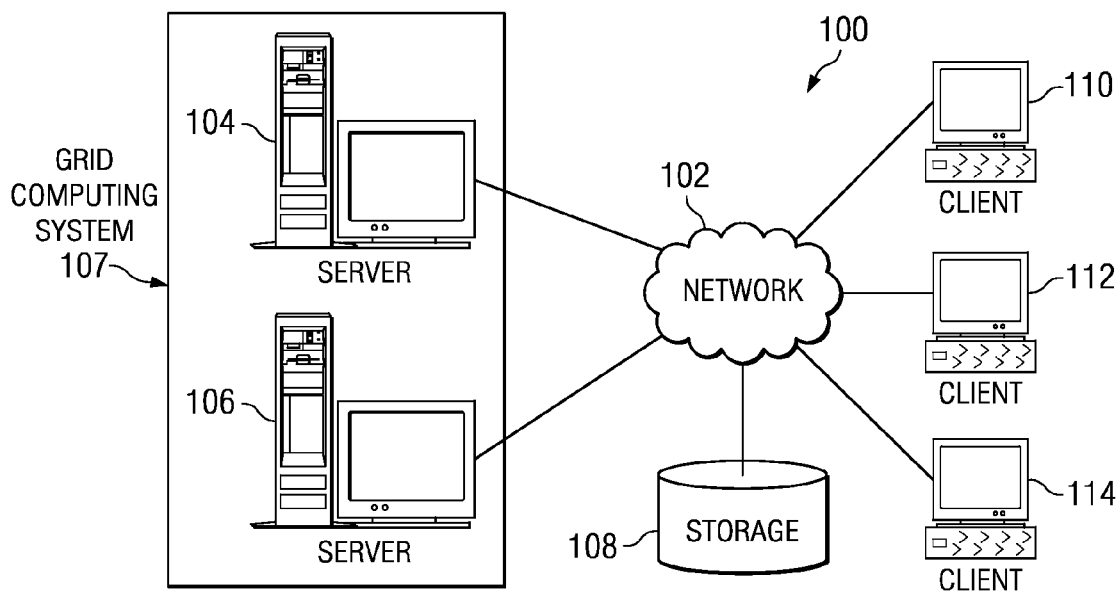
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any data storage medium that can store the program for use by or in connection with the instruction execution system, apparatus, or device. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable data storage medium that can direct a computer or other programmable data processing apparatus to function in a particular manner, such that the instructions stored The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
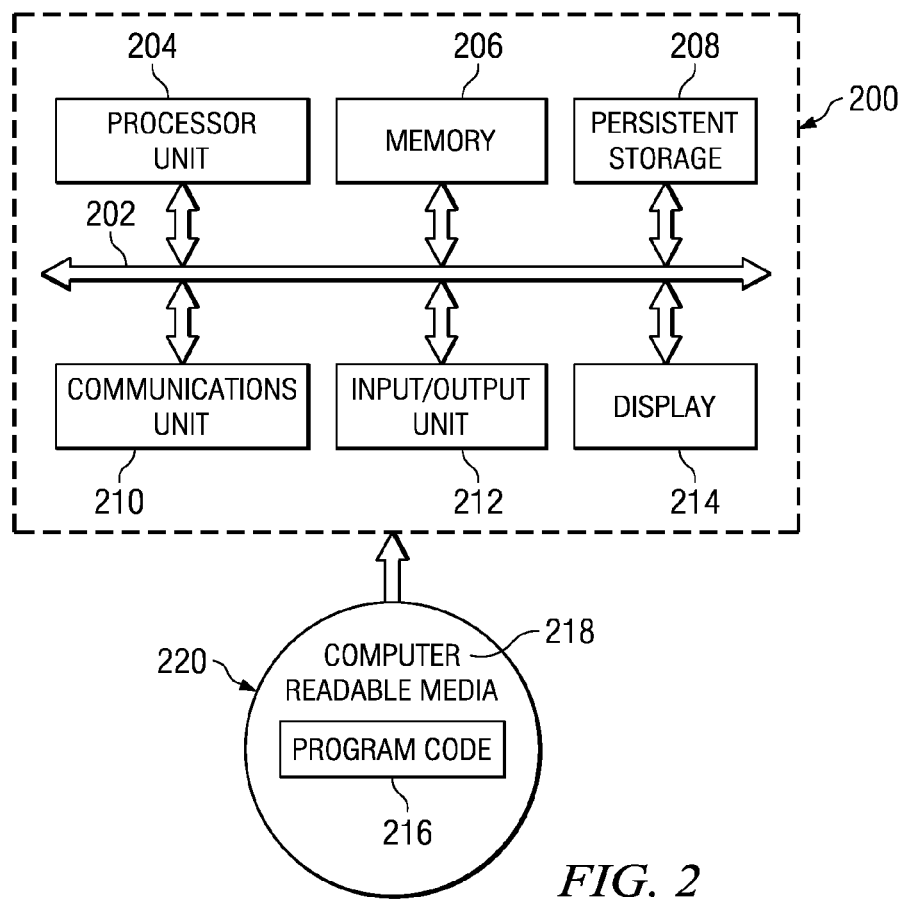
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. In particular, servers 104 and 106 form grid computing system 107. Grid computing system 107 is a system formed from two or more data processing systems for rendering and managing a virtual universe. Grid computing system 107 may include other servers or clients. Users of the virtual universe have agents on servers 104 and 106. An agent is a user's account. A user uses an agent to build an avatar representing the user. The agent is tied to the inventory of assets or possessions the user owns in the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. A server, such as server 104 may store a region of a virtual universe. A region is a virtual area of land within the virtual universe. In a virtual universe, assets, avatars, the environment, and anything visual consists of universally unique identifiers (UUIDs) tied to geometric data, textures, and effects data. Geometric data is distributed to a user's client computer, such as client 110, as textual coordinates. Textures are distributed to a user's client computer as graphics files, such as Joint Photographic Experts Group (JPEG) files. Geometric data and textures may be distributed to a client computer via network 102. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three-dimensional (3-D) graphics to represent various objects, such as landscapes, the sky, animals, vehicles, buildings, and other graphical objects.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client.

Objects in a virtual universe have predefined shapes and sizes based upon a location of an avatar in relation to the objects. The sizes of the objects may change according to a rigid set of rules that may prevent an avatar from clearly seeing an object. For example, the rules may dictate that an avatar at a distant location may be presented with the object, albeit in a smaller size. Consequently, the object may be too small to view clearly. Similarly, the rules may dictate that an avatar located close to the object should be presented with a large object, thus preventing the avatar from viewing the object or visual elements of the object in its entirety. Visual elements are images presented on the object. Visual elements may be, for example, logos, pictures, or text. Thus, an object owner's logo may be enlarged on the object to make it easier for a passing avatar to view and identify the object's owner.

Objects in a virtual universe may not have an optimal size for viewing by an avatar in a given location based upon the rigid rules. Thus, the illustrative embodiments recognize that current virtual universe systems lack the functionality to enable the modification of object sizes for improving visibility of those objects.

Therefore, the illustrative embodiments provide a computer implemented method, apparatus, and computer program product for modifying object sizes. In one embodiment, tracking data is obtained which identifies a location of a set of avatars in relation to a range of the object. The range of the object includes a viewable field. In response to determining that the object requires modification, a size of the object is compared with a set of size constraints to form a comparison. Thereafter, the size of the object is modified based on the comparison to form a set of size modifications.

An avatar's location is determined from tracking data. Tracking data is data describing a location of an avatar. Tracking data may be obtained from at least one of an object avatar rendering table and an object based avatar tracking controller. In other words, the tracking data may be obtained from either the object avatar rendering table, the object based avatar tracking controller, or both. However, in other embodiments, the tracking data may be obtained from any other source.

After obtaining the avatar tracking data, the process locates a set of size constraints if the object requires modification. The process then modifies the object according to the set of size constraints and the location of the object. As used herein, the term "set" refers to one or more. Thus, a set of size constraints includes one or more size constraints.

In one embodiment, an object is cloned for each avatar in the range of an object. Each avatar may then be presented with a clone of the object modified in a manner best suited for the avatar. In an alternate embodiment where cloning is not implemented, the size modifications may be calculated as the average distance of avatars in the viewable range of the object. Further, the average distance may be refined by a calculated priority of avatars. Thus, avatars that are determined to be of higher priority, such as through a status or rating data or based on a similarity between the avatar and the object, may be assigned a higher weighting when calculating the average distance compared to avatars lacking in relative priority.

Figure 3:
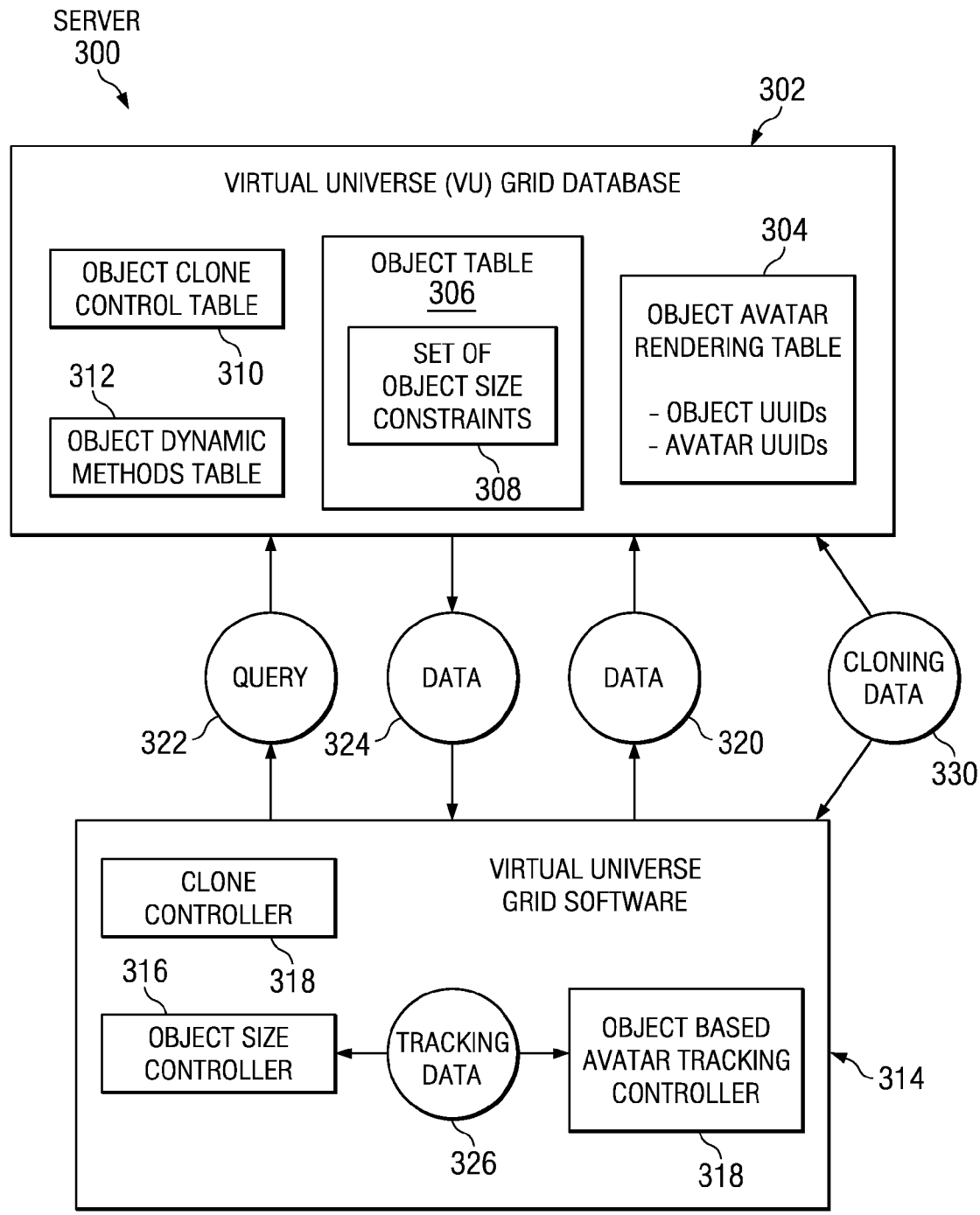
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server, such as server 104 in FIG. 1. Server 300 may be associated with a virtual universe. Server 300 may be a single, stand-alone server, or server 300 may be a server in a virtual universe grid computing system or in a cluster of two or more servers. In this example, server 300 is a server in a grid computing system such as grid computing system 107 in FIG. 1, for rendering and managing a virtual universe.

In a virtual universe, assets, avatars, the environment, and anything visual are correlated with universally unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Virtual universe grid database 302 is a database on the grid computing system for storing data associated with a virtual universe. This data includes, for example, without limitation, the universally unique identifiers and the associated geometric data, textures, and effects data. This data may be stored in one or more tables within virtual universe grid database 302. For example, virtual universe grid database 302 includes object avatar rendering (OAR) table 304. Object avatar rendering table 304 is a table that stores universally unique identifiers for objects and avatars and other data describing avatars within a viewable field of the object or within a selected zone associated with the object. For example, if the selected objects include object A and object B, then object avatar rendering table 304 stores a universally unique identifier for object A, universally unique identifiers and other data for all avatars within the viewable field of object A, universally unique identifiers for object B, and universally unique identifiers and other data for all avatars within the viewable field of object B.

In this illustrative example in FIG. 3, virtual universe grid database 302 also includes object table 306. Object table 306 is a table that includes set of object size constraints 308. Set of object size constraints 308 is one or more limitations that govern the size of an object in a virtual universe. For example, an object in a virtual universe may be a billboard displaying elements such as a logo and text. Thus, the object may be considered as the billboard, including the accompanying logo and text. Set of object size constraints 308 may limit the size of the billboard in a virtual universe. The size of the logo and text is also modified in relation to the size of the billboard.

In another embodiment, set of object size constraints 308 may also govern modification of the size of elements associated with the object. For example, set of object size constraints 308 may specify the size of a billboard in a virtual universe. In addition, set of object size constraints 308 may specify the actual size of the logo element and text element presented on the object. Thus, the size of elements of an object may be controlled independently from the size of the object to which the elements are associated.

In one embodiment, an object in a virtual universe is modified in relation to all avatars within the range of the object. In an alternate embodiment, each avatar in the range of the object is presented with a clone of the object. Additionally, each clone of the object is then modified according to the particular location of each avatar. To enable cloning of objects, virtual universe grid software 302 includes object clone control table 310.

Object clone control table 310 is a table storing, among other things, object universally unique identifiers, avatar universally unique identifiers, and instance universally unique identifiers. Instance universally unique identifiers are universally unique identifiers assigned to each clone that is created in a virtual environment. Instance universally unique identifiers allow methods to identify and modify the various clones that exist in a virtual universe.

The object methods that may be applied to each clone are stored in object dynamic methods table 312. Object dynamic methods table 312 is a table storing the object methods that may be applied to clones identified in object clone control table 310. In addition, object dynamic methods table 312 may associate each method with priority logic. The priority logic may be used for determining the order in which methods may be executed in the event that an object is subject to modification by more than one method.

Data stored in virtual universe grid database 302 is usable by virtual universe grid software 314. Virtual universe grid software 314 is a client-side application that exchanges data with virtual universe grid database 302 for rendering and managing the virtual universe. Virtual universe grid software 314 includes object size controller 316. Object size controller 316 is a software program for controlling the size of an object or elements of an object in a virtual universe. In particular, object size controller 316 is capable of controlling the size of an object by referencing set of size constraints 308. Set of size constraints 308 is one or more limitations specifying permissible modifications to an object in a virtual universe. Size constraints are discussed in more detail with respect to FIG. 5 below.

The implementation of set of size constraints 308 to control the size modifications of an object may be triggered, in part, by a location of an avatar in relation to an object. For example, as an avatar moves closer to an object, the object may decrease in size to improve the visibility of the object. The improved visibility may result from modifying the size of the object to enable the avatar to discern the object and any information presented thereon, for a longer period of time. In this example, as the avatar moves closer to the object, decreasing the size of the object prevents the object from growing too large to the point where the avatar is no longer capable of viewing the object in its entirety. Thus, if the object is a billboard, preventing the billboard from growing too large, even as the avatar is moving toward the billboard, will enable the avatar to read the information presented on the billboard for a longer period of time. Consequently, the visibility of the billboard, and the information presented thereon, is improved.

In addition, moving away from an object may cause the object to increase in size to provide improved visibility of the object. Increasing the size of an object, at least temporarily, will enable an avatar to view an object and discern any information presented thereon for a greater amount of time. Thus, the avatar's relative location to the object is used by object size controller 316 to determine whether the object requires modification. Object based avatar tracking controller 318 ascertains an avatar's location relative to an object.

Object based avatar tracking controller 318 is a software program that manages information describing the location of an avatar in a virtual universe in relation to an object. In particular, object based avatar tracking controller 318 stores data 320 in object avatar rendering table 304. Data 320 includes the universally unique identifiers and other data describing avatars within the viewable field of the selected objects. When object based avatar tracking controller 318 needs data from object avatar rendering table 304 for initiating or implementing geometric and texture modifications in the virtual universe, object based avatar tracking controller 318 sends query 322 to object avatar rendering table 304. In response to query 322, virtual universe grid database 302 sends data 324 to virtual universe grid software 314. Data 324 is used by object based avatar tracking controller 318 to track avatars and, in some embodiments, implement modifications of the selected objects. The modifications may, in some instances improve the position and appearance of the selected objects within the virtual universe and thus provide improved visibility of the selected objects.

Object size controller 316 obtains tracking data 326 for controlling the size of an object based upon a location of an avatar to the object. Tracking data 326 is data that identifies a location of an avatar in relation to a range of an object. In this example, object size controller 316 obtains tracking data 326 from object based avatar tracking controller 318 as tracking data 326 is generated. However, in an alternate embodiment, object size controller 316 may obtain tracking data 326 from object avatar rendering table 304. In yet another embodiment, object size controller 316 may obtain tracking data 326 from any other source.

Tracking data 326 may also be obtained by clone controller 328 for generating clones of objects for presentation to a set of avatars in a range of the object. Clone controller 328 is software for generating clones of objects within a virtual universe. Clone controller 328 may generate a clone of an object for each avatar in a particular range of an object. A range of an object is an area proximate to an object and may include one or more sub regions. For example, a range of an object includes a viewable field and a detection area, as is depicted in regard to object 802 in FIG. 8.

Clone controller 328 initiates the process of generating clones when the location of an avatar is within a range of an object. Clone controller 328 may determine that the avatar's location is in the range of an object by obtaining tracking data 326. Tracking data 326 is data that identifies a location of an avatar in relation to a range of an object. In this example, clone controller 328 obtains tracking data 326 from object based avatar tracking controller 318 as tracking data 326 is generated. However, in an alternate embodiment, clone controller 328 may obtain tracking data 326 from object avatar rendering table 304. In yet another embodiment, clone controller 328 may obtain tracking data 326 from any other source.

Each clone that is generated may be rendered according to a different object method. For example, an object method may illuminate a portion of the object, enhance the size of an object, change the color of an object, or remove the effect of another method that otherwise obscures the object. Clone controller 328 stores cloning data 330 into object clone control table 310 for use to track the various clones and object methods. Cloning data 330 is data that includes the universally unique identifiers of objects, avatars, and clones. Clone controller 328 may also reference cloning data 330 stored in object clone control table 310 for identifying and invoking a set of object methods that may be rendered with respect to each clone.

The clones may be used to improve the visibility of the object from which the clone was derived. Improved visibility may be achieved by cloning the object so that each cloned object may be modified using a different object method for modifying the size of the object. For example, two avatars may view the same object from different distances. The first avatar is further from the object whereas the second avatar is closer to the object. If a single object was enlarged so that the first avatar could clearly see the object and the information presented thereon, the object may be too large for the second avatar to view in its entirety. Consequently, the visibility of the object from the perspective of the second avatar is diminished. However, by presenting each avatar with a clone of the object, each clone may be modified using an object method that improves the visibility of the clone for each avatar. The object methods may be selected based on the avatar's distance from the object.

Figure 4:
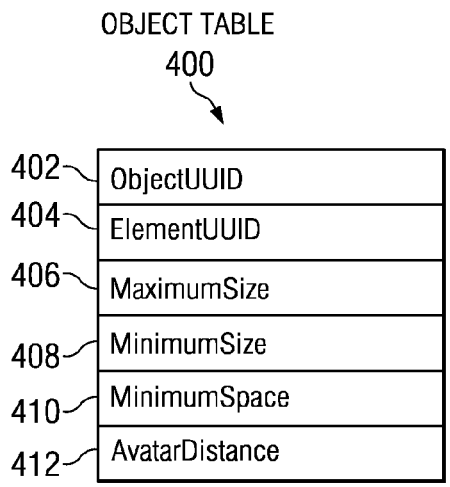
FIG. 4 is diagram of an object table in accordance with an illustrative embodiment.

FIG. 4 is a diagram of an object table in accordance with an illustrative embodiment. Object table 400 is an object table such as object table 306 in FIG. 3. ObjectUUID 402 is a primary key field for object table 400. ObjectUUID 402 may be used to associate records of object table 400 with records stored in other tables within a virtual universe grid database. The other tables include, for example, object avatar rendering table 304 and object clone control table 310.

Object table 400 also includes ElementUUID 404. ElementUUID 404 is a field storing universally unique identifiers for the elements of an object. For example, if the object is a flyer posted on a building in a virtual universe, then the elements of the flyer may include, for example, one or more pictures or logos and/or text elements. Each picture, logo, or text element may be assigned its own ElementUUID stored in ElementUUID 404.

Object table 400 also includes a set of size constraints, such as set of size constraints 308 in FIG. 3. In this example in FIG. 4, the set of size constraints includes MaximumSize 406, MimimumSize 408, and MinimumSpace 410. MaximumSize 406, MimimumSize 408, and MinimumSpace 410 are size constraints because they limit the size of an object and/or elements of the object in a virtual universe. For example, MaximumSize 406 is a field of object table 400 storing a value that limits the maximum size attainable by an object or an element of the object. Similarly, MimimumSize 408 is a field storing a value that limits the minimum size attainable by an object or an element of the object.

MinimumSpace 410 is a field of object table 400 that stores a set of values for specifying a minimum amount of space between elements of an object. In addition, MinimumSpace 410 may specify the minimum amount of space between an element of the object and the edge of an object. For example, if the object is a billboard having one logo element and one text element, then the value or values stored in MinimumSpace 410 may require that the logo element and text element remain a fixed number of distance units away from one another. Likewise, the values stored in MinimumSpace 410 may specify that the edges of the logo element and or the text element remain a fixed number of distance units from the edge of the billboard. For example, MinimumSpace 410 may require that the edges of a logo element and a text element remain 4 pixels apart from one another. Thus, MinimumSpace 410 prevents the elements of an object from overlapping or exceeding the boundaries of the object.

AvatarDistance 412 is a field of object table 400 storing values that dictate when a size constraint is to be implemented. A value stored in AvatarDistance 412 may be a fixed distance so that an object may be modified when an avatar moves to the specified distance. Alternatively, data within AvatarDistance 412 may specify that an object is modified when the avatar is in a range of the object. Thus, for example, an avatar may be presented with an object having a maximum size when the avatar reaches a viewable field of the object. This distance may be defined by the value stored in AvatarDistance 412. In addition, this maximum size is specified by a value stored in MaximumSize 406. The object may shrink steadily smaller as the avatar approaches the object until the object attains the minimum size specified in MimimumSize 408.

Figure 5:
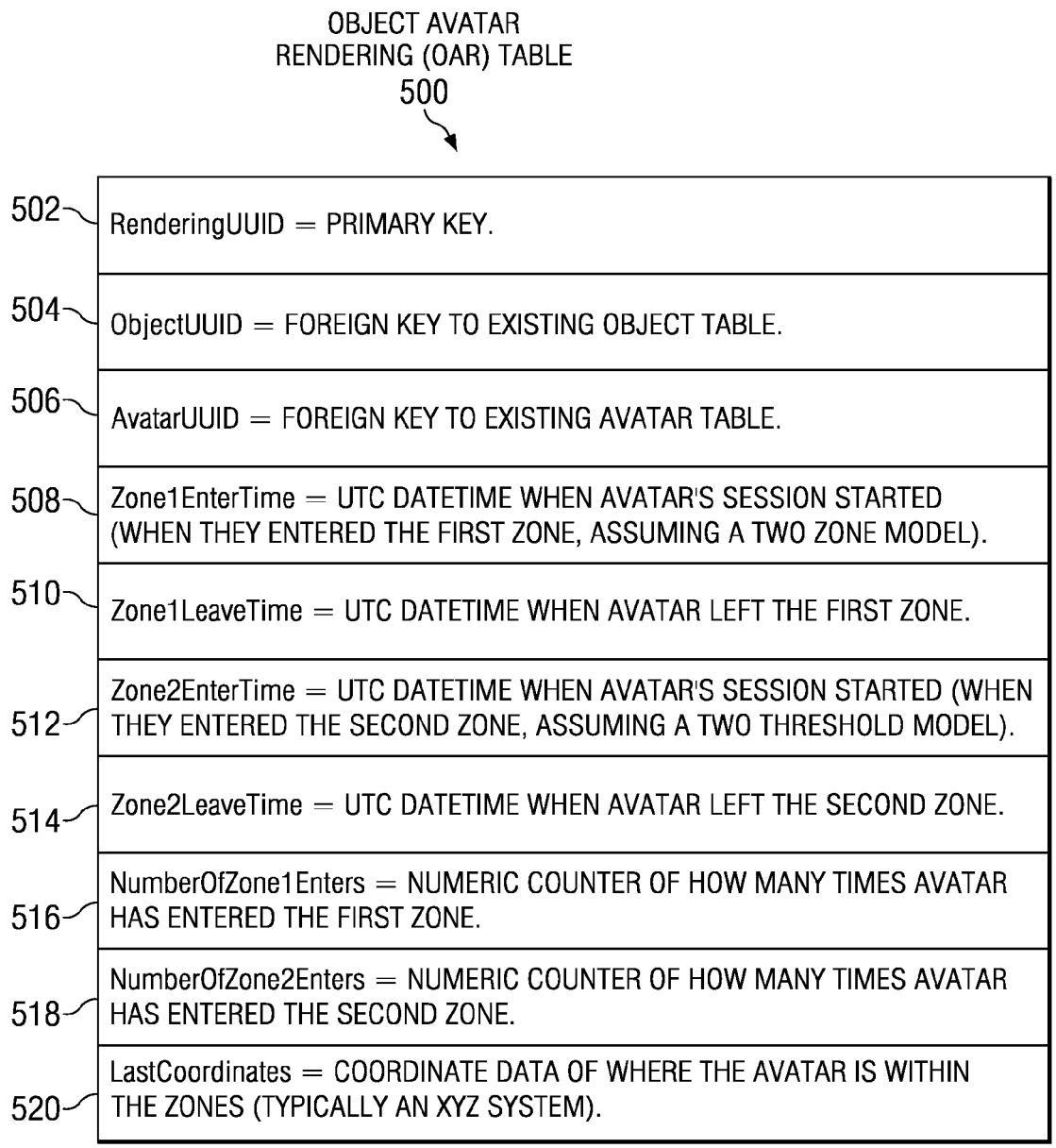
FIG. 5 is a diagram of an object avatar rendering table in accordance with an illustrative embodiment.

FIG. 5 is a block diagram of an object avatar rendering table in accordance with an illustrative embodiment. Object avatar rendering table 500 is an example of data in an object avatar rendering table, such as object avatar rendering table 304 in FIG. 3.

RenderingUUID 502 is a primary key for object avatar rendering table 500. ObjectUUID 504 is a universally unique identifier for a selected object in a virtual universe. ObjectUUID 504 is a foreign key to the existing object table. AvatarUUID 506 is a foreign key to the existing avatar table. AvatarUUID 506 includes a universally unique identifier for each avatar in the viewable field of the object associated with ObjectUUID 504.

Zone1EnterTime 508 is a field of a date and/or time when an avatar enters a first zone within the viewable field of an object. Zone1LeaveTime 510 is a field for a date and/or time when the avatar leaves the first zone. Zone2EnterTime 512 is a field in object avatar rendering table 500 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 514 is a field for storing the date and/or time when a given avatar leaves the second zone. NumberofZone1Enters 516 is a field for storing the number of times a particular avatar has entered the first zone. This information may be useful to determine whether a user operating the particular avatar has never viewed the object. If the user has never viewed the object, then the content associated with an object should be displayed in full to the user associated with the avatar. The information in NumberofZone1Enters 516 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 518 is a field for storing the number of times an avatar has entered the second zone. LastCoordinates 520 is a field for storing the coordinate data describing where a given avatar is within the first zone or the second zone of a selected object. The coordinate data is typically given in xyz type coordinate data.

Figure 6:
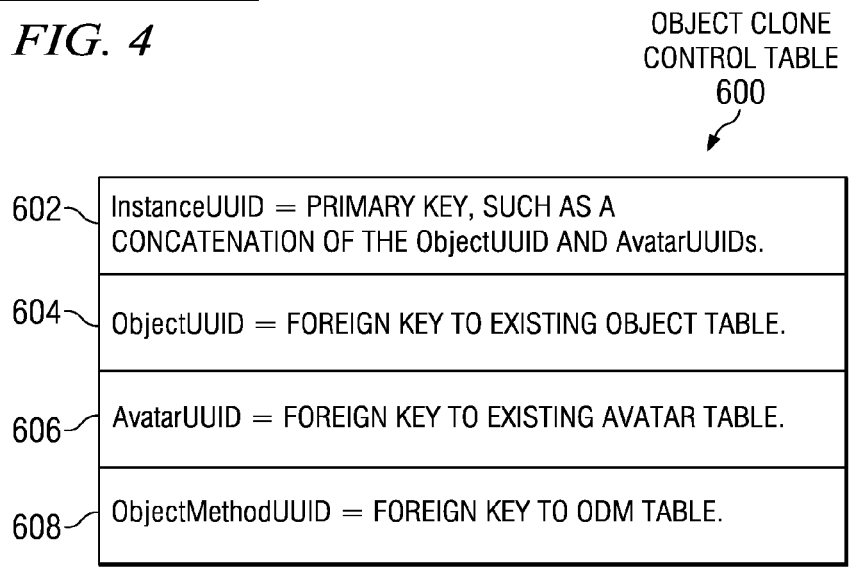
FIG. 6 is a diagram of an object movement control table in accordance with an illustrative embodiment.

FIG. 6 is a block diagram of an object movement control table in accordance with an illustrative embodiment. Object clone control table 600 is an example of data in an object clone control table, such as object clone control table 310 in FIG. 3.

InstanceUUID 602 is a primary key for object clone control table 600. In one embodiment, InstanceUUID 602 is a concatenation of avatar and object universally unique identifiers.

ObjectUUID 604 is a universally unique identifier for a selected object in a virtual universe. ObjectUUID 604 is a foreign key to the existing object table. AvatarUUID 606 is a foreign key to the existing avatar table. AvatarUUID 606 includes a universally unique identifier for each avatar in the viewable field of the object associated with ObjectUUID 604. ObjectMethodUUID 608 is a foreign key linking to an object dynamic methods table, such as object dynamic methods table 700 in FIG. 7.

Figure 7:
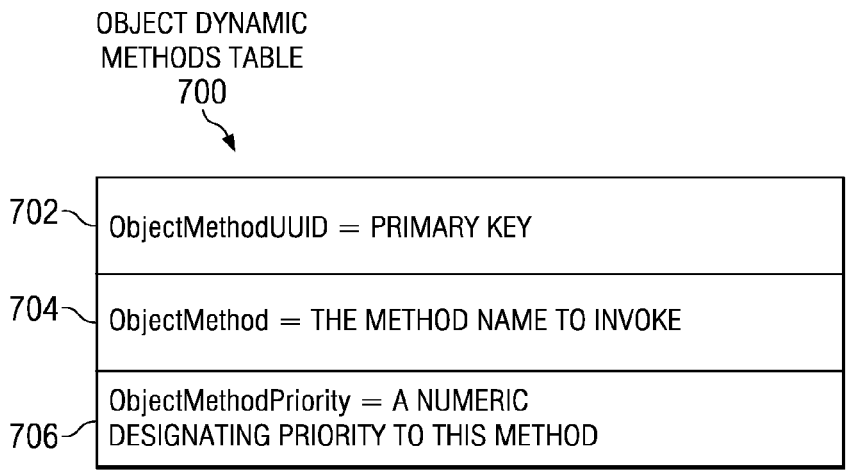
FIG. 7 is a diagram of an object dynamic methods table in accordance with an illustrative embodiment.

FIG. 7 is a block diagram of an object dynamic methods table in accordance with an illustrative embodiment. Object dynamic methods table 700 is an example of data in a dynamic methods table, such as object dynamic methods table 312 in FIG. 3.

ObjectMethodUUID 702 is a primary key for object dynamic methods table 700. ObjectMethodUUID 702 is related to ObjectMethodUUID 608 in FIG. 6 for identifying the method(s) that may be invoked with respect to a clone identified by InstanceUUID 602 in FIG. 6.

ObjectMethod 704 is a field of data storing the name of the method that may be invoked for application to an object. ObjectMethod 704 may include one or more methods that may be invoked for application to an object. The order in which the methods are to be invoked is determined according to priority logic. In one embodiment, the priority logic specifies that methods are invoked in accordance with a relative priority ranking. The rankings may be stored in ObjectMethodPriority 706.

ObjectMethodPriority 706 is a field storing a numeric designating the priority in which methods of object methods table 700 may be invoked. For example, in the event that multiple methods are queried for an object, or a clone of the object, the numeric in ObjectMethodPriority 706 may be referenced to determine the order in which the methods are to be invoked.

In an illustrative embodiment, object clone control table 600 and object dynamic methods table 700 are linked by an ObjectMethodUUID field, such as ObjectMethodUUID 608 in FIG. 6 and ObjectMethodUUID 706 in FIG. 7. The linking of object clone control table 600 and object dynamic methods table 700 enables a clone controller, such as clone controller 328 in FIG. 3, to determine whether a clone of an object exists. For example, the clone controller may determine that a clone of an object exists if there exists in an object clone control table an InstanceUUID identifying a clone of the object. In one embodiment, this determination may be initiated when an avatar enters a detection area of an object.

The entrance of an avatar into the detection area of an object may also cause a clone controller to instantiate a set of object clones. Thus, an avatar may be presented with two clones for an object. The first clone may be of an object located at a fixed point. The second clone may be of an object that remains in the field of view of the avatar regardless of the direction in which the avatar is facing.

Further, the clone controller may use linked object clone control table 600 and object dynamic methods table 700 to invoke a set of object methods associated with the clone identified by the unique InstanceUUID. In one embodiment, the set of methods may be invoked when an avatar enters a viewable area of an object. Viewable areas are discussed in more detail in FIG. 9.

Figure 8:
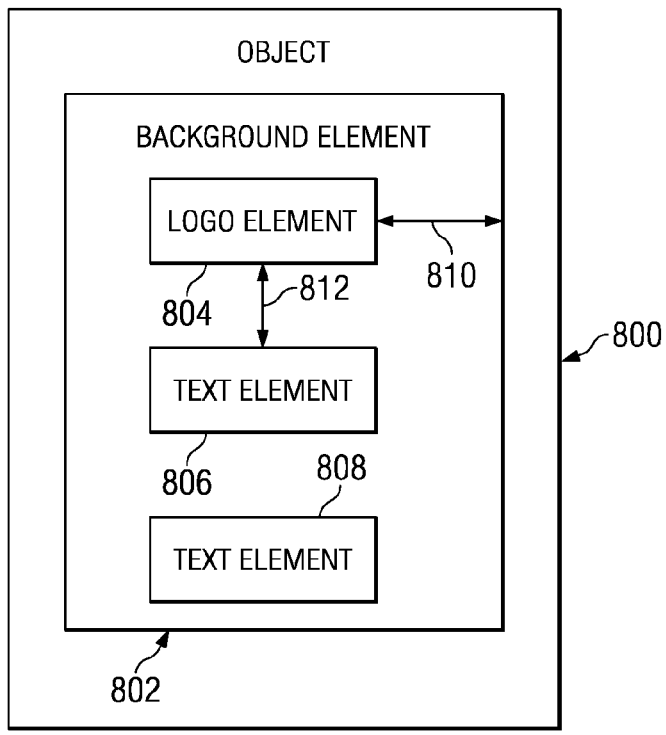
FIG. 8 is a diagram of an object modifiable according to a set of size constraints in accordance with an illustrative embodiment.

FIG. 8 is a diagram of an object modifiable according to a set of size constraints in accordance with an illustrative embodiment. Object 800 is an entity in a virtual universe that is not directly controlled by a user or associated with a user's account. An object may be, for example, buildings, statues, billboards, signs, and advertisements in the virtual universe. In this example, object 800 is an advertisement, such as a billboard or a sign.

Object 800 includes a set of elements. In particular, the set of elements of object 800 includes background element 802, logo element 804, and text element 806. Background element 802 is an element of object 800 that serves as a backdrop to logo element 804 and text element 806. Background element 802 may be, for example, a block of color, a photograph, or picture.

Logo element 804 is an element of object 800 that may identify the owner of the object. For example, logo element 804 may be a company trademark.

Text element 806 is an element of object 800 that presents to avatar text-based images. For example, text element 806 may be a slogan or catch phrase associated with the owner of object 800. Alternatively, text element 500 may inform a user of a particular item or service offered for sale either in the virtual universe or in the real world.

The dimensions or size of object 800 may be modified according to a set of sizing constraints, such as sizing constraints 308 in FIG. 3. In one embodiment, sizing constraints govern only the sizing of object 800. In this embodiment, the size of background element 802, logo element 804 and text element 806 are defined as a fixed size in relation to object 800. Thus, if object 800 is decreased in size by 10 percent, then the size of background element 802, logo element 804, and text element 806 is decreased in size by 10 percent.

In an alternate embodiment, the dimensions of background element 802, logo element 804, and text element 806 may be modified independently of the size of object 800. Further, the size of background element 802, logo element 804, and text element 806 may be modified independently of one another. Thus, for example, object 800 and background element 802 may be increased 10 percent in size whereas logo element 804 is increased in size by 15 percent. Text element 806 may be decreased in size to accommodate the larger size of logo element 804.

Modification of the elements of object 800 may result in the elements overlapping and thus obscuring the information presented on object 800. Additionally, an element of an object may be cut off if the element is too large to fit within the borders of an object. As such, distance 808 is measured and maintained to prevent an element from becoming too large for an object. Distance 810 is measured to prevent overlap of object elements.

Distance 808 is a distance between an element of object 800 and a border. In this example, the border is the edge of background element 802. In an alternate example, where object 800 lacks a background element, distance 808 may be measured from logo element 804 to the border of object 800. Furthermore, distance 808 may be measured from any element of object 800, including text element 806. A permissible value of distance 808 may be stored in a field of an object table specifying a minimum space, such as MinimumSpace 410 of object table 400 in FIG. 4. Different elements may have different permissible values for distance 808. Thus, for example, logo element 804 may be enlarged to come within 5 pixels of a border, such as background element 802. In this same example, text element 808 may be permitted to be enlarged to come within 15 pixels of a border.

Distance 810 is a distance between elements of object 800 to prevent overlapping elements. A permissible value of distance 810 may be stored in a field of an object table specifying a minimum space, such as MinimumSpace 410 of object table 400 in FIG. 4.

Figure 9:
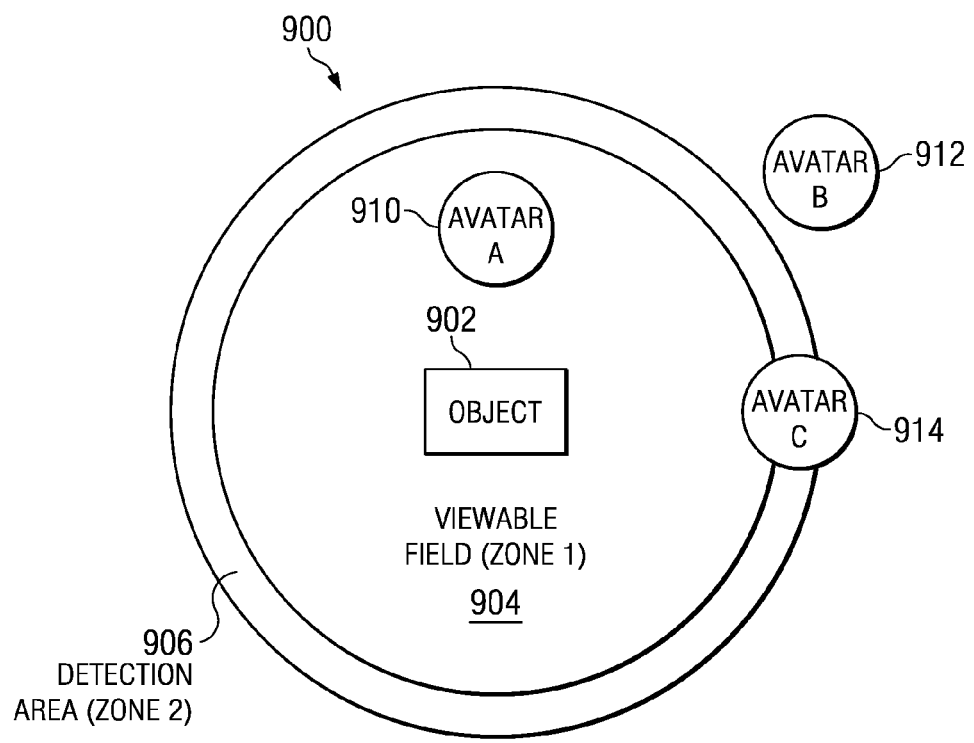
FIG. 9 is a block diagram of a viewable area for an object in accordance with an illustrative embodiment.

FIG. 9 is a block diagram of a viewable area for an object in accordance with an illustrative embodiment. Range 900 is defined with respect to object 902. Object 902 is an entity in a virtual universe that is not directly controlled by a user or associated with a user's account. An object may be, for example, buildings, statues, billboards, signs, and advertisements in the virtual universe. In this example, object 902 is an advertisement, such as a billboard or a sign. Range 900 is an area associated with the viewing of object 902. Range 900 includes viewable field 904 and detection area 906 associated with object 902 in a virtual universe.

Viewable field 904 is an area in a given proximity of object 902. Viewable field 904 has a focal point or center at a location that is the same as the location of object 902. Viewable field 904 may also be referred to as zone 1 or a first zone. An avatar in viewable field 904 is able to see or view object 902 and/or content associated with object 902. For example, object 902 may be associated with video and/or audio content. Object 902 may have some movement associated with the object. For example, object 902 may be capable of some limited movement or animation. However, object 902 is substantially limited to a single location in the virtual universe.

Detection area 906 is an area adjacent to viewable field 904 within range 900. Detection area 906 may also be referred to as a second zone or zone 2. An avatar in detection area 906 cannot see object 902 or view content associated with object 902. However, when an avatar enters detection area 906, the object avatar tracking controller software can begin preparing to display object 902 and content associated with object 902 to the avatar when the avatar enters viewable field 904.

In this example, avatar A 910 is within viewable field 904. Therefore, avatar A 910 is able to view or see object 902. Avatar B 912 is not able to see or view object 902. In addition, avatar B 912 is not close enough to viewable field 904 to indicate that avatar B 912 may be preparing to enter viewable field 904. Avatar C 914 is within detection area 906. Avatar C 914 is not able to see or view object 902. However, the presence of avatar C 914 indicates that avatar C 914 may be about to enter viewable field 904 or that avatar C 914 has just left viewable field 904. Avatar B 912 is outside range 900. Therefore, an object avatar tracking table for object 902 includes entries for avatar A 910 in zone 1 and avatar C 914 in zone 2. However, the object avatar tracking table will not include data or records for avatar B 912 because avatar B 912 is outside both viewable field 904 and detection area 906.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 10:
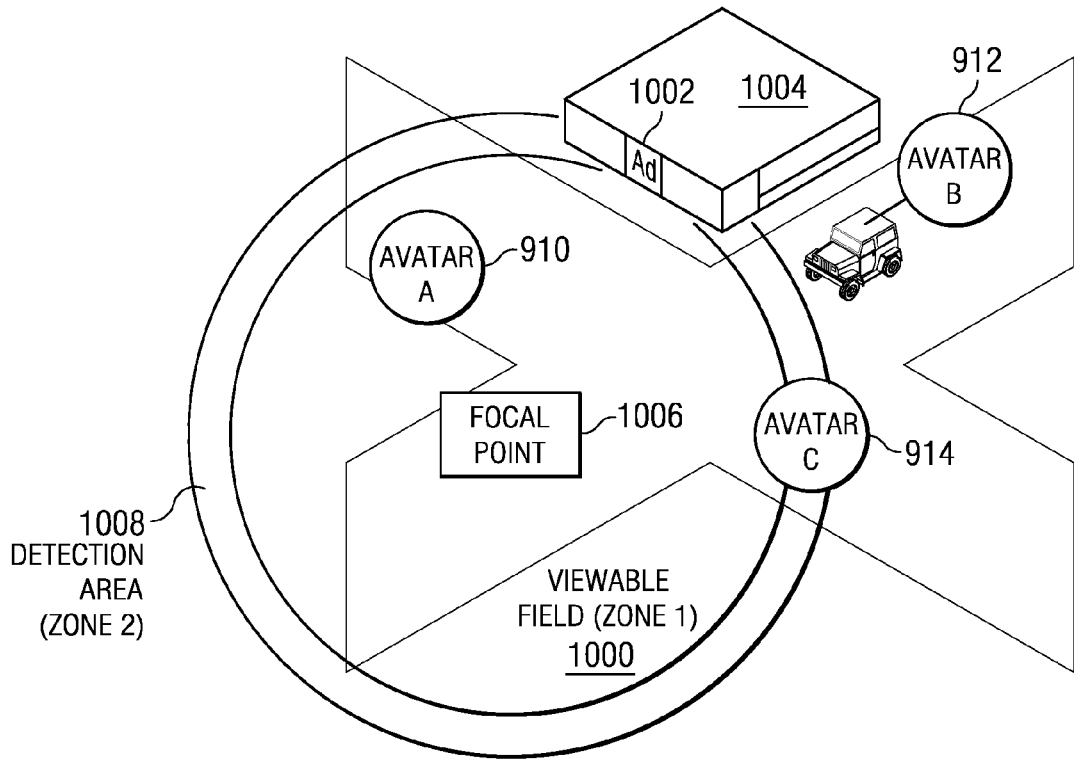
FIG. 10 is a block diagram of a viewable area for an object having a focal point at a location other then the location of the object in accordance with an illustrative embodiment.

FIG. 10 is a block diagram of a viewable area for an object having a focal point at a location other than the location of the object in accordance with an illustrative embodiment. Viewable field 1000 is a viewable field for object 1002. Object 1002 is an object, such as object 800 in FIG. 8. In this example, object 1002 is an advertisement in front of object 1004. Viewable field 1000 is a range in which an avatar, such as avatar A 910, avatar B 912, and avatar C 914 can see object 1002.

Viewable field 1000 has focal point 1006. Focal point 1006 is a point from which the range, or area, of viewable field 1000 for an object is determined. In other words, viewable field 1000 is an area that is identified based on a predetermined radius or distance from focal point 1006. Here, focal point 1006 is a location that is different than the location of object 1002 because object 1002 is adjacent to an obstructing object, such as object 1004.

In this example, when avatar C 914 comes in range of detection area 1008 of object 1002, object based avatar tracking controller, such as object based avatar tracking controller 318 in FIG. 3, makes a determination as to whether there is an existing session associated with the universally unique identifier of object 1002 and the universally unique identifier of avatar C 914. This step may be implemented by making a query to the object avatar rendering table to determine if avatar C 914 has ever entered zone 2 or zone 1 previously. If there is not an existing session for avatar C 914, the object based avatar tracking controller creates a record in the object avatar rendering table with the universally unique identifier of object 1002 and the universally unique identifier of avatar C 914.

The record in the object avatar rendering table may optionally include additional information, such as, without limitation, a date and time when avatar C 914 entered zone 2, a date and time when avatar C 914 leaves zone 2, a date and time when avatar C 914 enters zone 1, a number of zone 2 enters, a number of zone 1 enters, coordinates of avatar C 914, and any other data describing avatar C 914. This data is used by the virtual universe grid software for analysis, reporting, and billing purposes.

Object 1002 may have an initiation process associated with object 1002. For example, if object 1002 is an advertisement with an audio and video content associated with viewing object 1002, an initiation process may include buffering the audio and/or video content, checking a cache for the audio and/or video content, caching the audio and/or video content, or any other initiation process. In another embodiment, the initiation process may include sending messages to a clone controller, such as clone controller 328 in FIG. 3. The message may notify the clone controller to retrieve tracking data, such as tracking data 326 in FIG. 3, because an avatar is in range of object 1002. In addition, the initiation process may include querying databases to determine the existence of clones of object 1002.

When avatar C 914 enters viewable field 1000, an object based avatar tracking controller may trigger any object initiation process defined by object 1002. For example, when avatar C 914 enters viewable field (zone 1) 1000, the object based avatar tracking controller may display the buffered or cached content. If a user is viewing the object for the first time and object 1002 has a video or audio file associated with viewing the object, the process starts playing the video or audio from the beginning.

In another embodiment, a clone controller, such as clone controller 328 in FIG. 3, may query an object clone control table, such as object clone control table 500 in FIG. 5, and/or instantiate a clone of object 1002 when avatar C 914 enters detection area 1008. Thereafter, when avatar C 914 enters viewable field 1000, a clone controller may invoke a set of methods associated with the object clone of object 1002 for presentation to avatar C 914.

If a session already exists, the object based avatar tracking controller triggers any object re-initiation process defined by the object. For example, if the user is not viewing an object with an associated video for the first time, the process starts playing the video at a point in the video after the beginning to avoid replaying introductory material. This point may be, for example, immediately after an introduction, in a middle part, or near the end of the video.

The object based avatar tracking controller makes a determination as to whether the position of avatar C 914 has changed. Changing position, in these examples, may include traveling, turning, walking, or disappearing, such as teleporting, logging off, or disconnecting. When the position of avatar C 914 changes, the object based avatar tracking controller adds the user position data to the object avatar rendering table, such as at a field for last coordinates 420 in FIG. 4. The user position data includes angle of view coordinate data of the avatar relative to object 1002 and the distance of avatar C 914 to object 1002.

A clone controller, such as clone controller 328 in FIG. 3 may then modify object 1002 according to a set of methods stored in an object dynamic methods table, such as object dynamic methods table 600 in FIG. 6. Modifications may be made by invoking an object method that is selected, in part, upon user position data. The modification of object 1002 is capable of improving the visibility of object 1002 to an avatar in viewable field 1000.

When avatar C 914 is out of range of viewable field 1000 and detection area 1008, the object based avatar tracking controller logs a session pause for the session associated with avatar C 914. The log may include the date and time of the session pause. When the session has been paused for an amount of time that exceeds a threshold amount of time, the object based avatar tracking controller terminates the session associated with avatar C 914. The process termination may include, for example, without limitation, removing the records and data associated with avatar C 914 from the object avatar rendering table. If the record is not deleted, when avatar C 914 comes back into range of zone 1 or zone 2 of object 1002, the object based avatar tracking controller determines that an existing session associated with the universally unique identifier of object 1002 and a universally unique identifier of avatar C 914 already exist. In such a case, a new record for avatar C 914 will not be created. Instead, the data in the object based avatar rendering table will be updated with new data regarding avatar C 914 in the range of object 1002.

Figure 11:
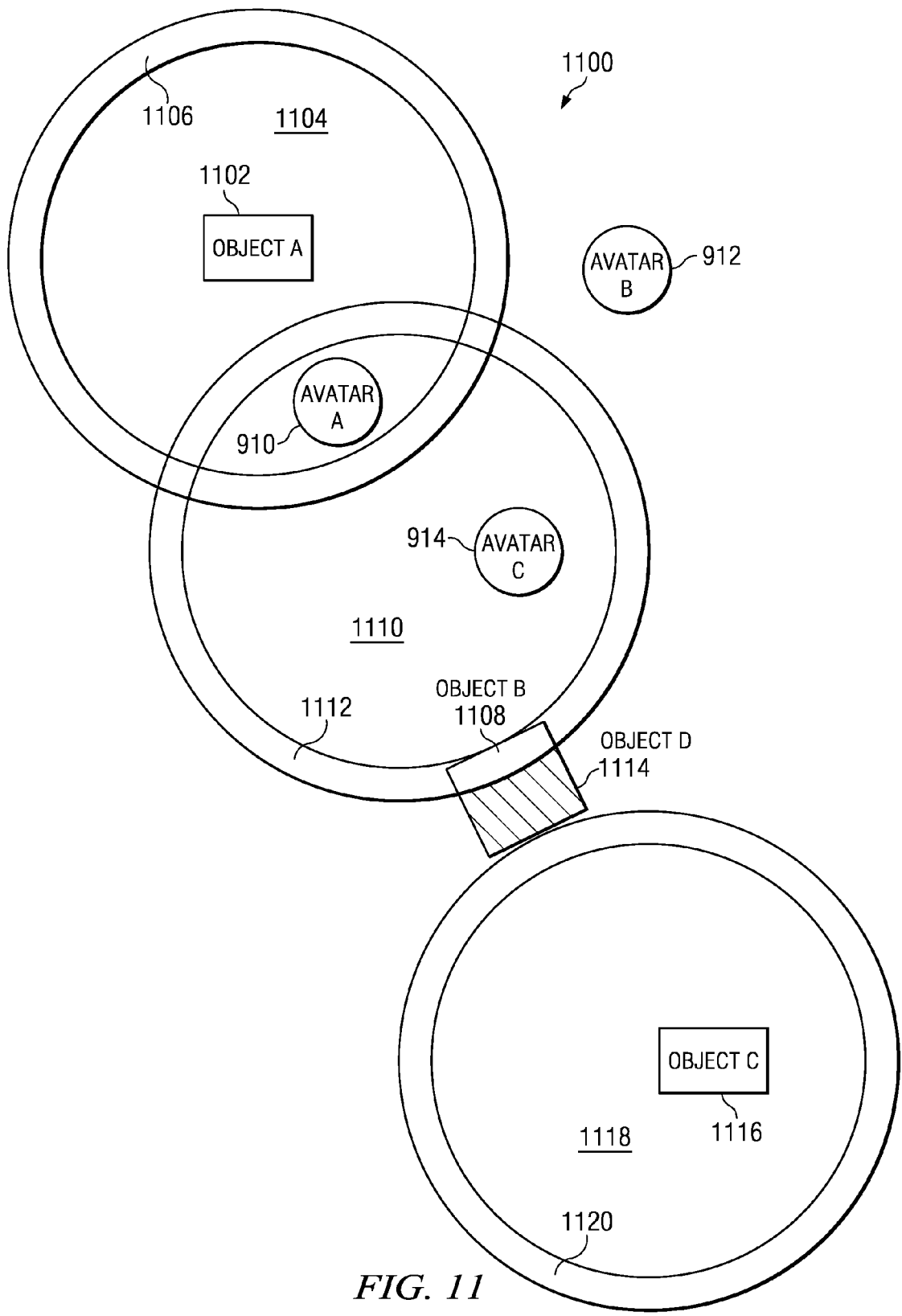
FIG. 11 is a block diagram of viewable areas for a plurality of objects in accordance with an illustrative embodiment.

FIG. 11 is a block diagram of viewable areas for a plurality of objects in accordance with an illustrative embodiment. Region 1100 is a region in a virtual universe. Region 1100 is associated with a server, such as server 104 in FIG. 1. Each region in a virtual universe is typically supported by a different server.

Object 1102 is associated with viewable field (zone 1) 1104. Object 1102 may also optionally have a detection area (zone 2) 1106. Viewable field (zone 1) 1110 is a viewable area associated with object B 1108. Object B 1108 may also have a detection area (zone 2) 1112. In this example, viewable field 1110 overlaps in part with a portion of viewable field 1104. Object C 1116 is associated with viewable field 1118. Object C 1116 is optionally associated with detection area (zone 2) 1120.

In this example, avatar A 912 is within viewable field 1104 of object A 1102 and viewable field 1110 of object B 1108. In other words, avatar A 912 can see object A 1102 or object B 1108. Avatar C 914 is within viewable field 1110 of object B 1108. Avatar C 914 is able to see or view object B 1108. Avatar B 912 is outside the viewable fields of objects 1102, 1108, 1114, and 1116.

Figure 12:
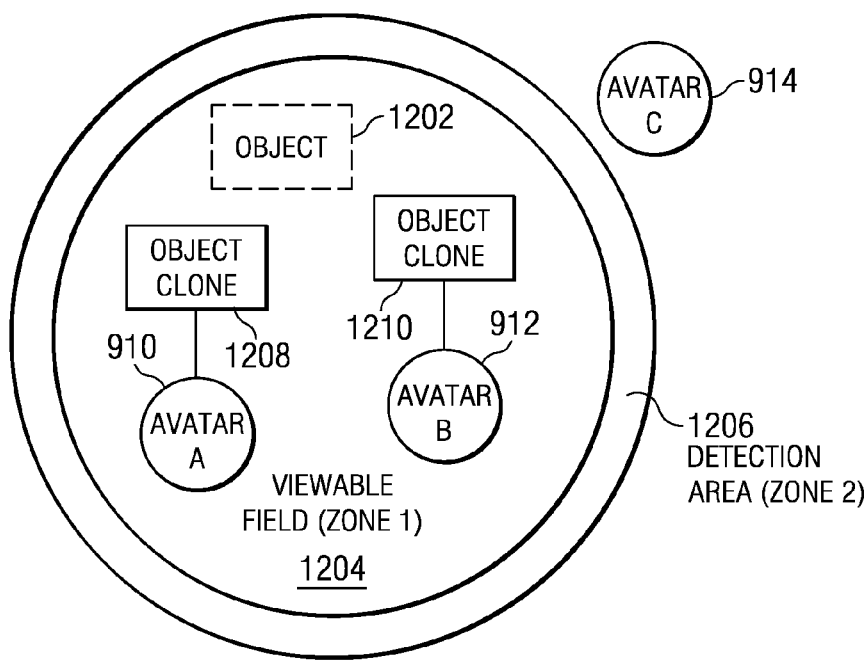
FIG. 12 is a block diagram of an object based avatar table for a plurality of objects in accordance with an illustrative embodiment.

FIG. 12 is a block diagram of a set of clones presented to a set of avatars in accordance with an illustrative embodiment. The set of clones are clones of object 1202.

Object 1202 is associated with a range having viewable field 1204 and detection area 1206. In this example, avatar A 910 and avatar B 912 are located within viewable field 1204. Avatar C 914 is located outside of the range of object 1202.

Because avatar A 910 and avatar B 912 are located within viewable field 1204, avatar A 910 and avatar B 912 are presented with object clone 1208 and object clone 1210, respectively. Object clones 1208 and 1210 are clones of object 1202. Each clone of object 1202 may be rendered differently according to the various methods associated therewith. For example, because avatar A 910 is located further from object 1202, then object clone 1208 may be a clone of object 1202 modified by a geometric and texture modification method that enhances the size of object 1202.

In addition, because avatar B 912 is located closer to object 1202, but at an angle to object 1202, then object clone 1210 may be a clone of object 1202 modified by a geometric and texture modification method that eliminates glare that may reflect from object 1202.

FIG. 13 is a block diagram of an object based avatar table for a plurality of objects in accordance with an illustrative embodiment. Object based avatar table 1300 is an object based avatar table for a plurality of selected objects. In this example, object based avatar table 1300 includes a universally unique identifier for selected object A 1302 and object B 1320. Data describing avatars for each selected object are also included.

For example, object based avatar table 1300 includes avatar A UUID 1304, avatar A zone 1 enter time 1306, avatar A zone 2 enter time 1308, avatar A zone 1 leave time 1310, and avatar A zone 2 leave time 1312. Object based avatar table 1300 includes data regarding avatars associated with zone 1 and zone 2 of object B 1320. For example, and without limitation, object based avatar table 1300 includes avatar A UUID 1322, avatar A zone 1 enter time 1324, avatar A zone 2 enter time 1326, avatar A zone 1 leave time 1328, avatar A zone 2 leave time 1330, avatar C UUID 1332, avatar C zone 1 enter time 1334, avatar C zone 2 enter time 1336, avatar C zone 1 leave time 1338, and avatar C zone 2 leave time 1340.

The fields and data shown in object based avatar table 1300 are only examples of fields and data that may be included in an object based avatar table. However, implementations of object based avatar tables are not limited to only including the data and/or fields shown in FIG. 13. An object based avatar table may include additional data and/or additional fields not shown in FIG. 13.

In addition, object based avatar table 1300 in this example only includes data and fields for two objects and two different avatars. However, an object based avatar table may include fields and/or data for any number of objects and any number of avatars. In other words, object based avatar table 1300 may include fields and/or data for a single object, as well as two or more objects. Likewise, object based avatar table 1300 may include fields and/or data for tracking a single avatar associated with each object, as well as two or more avatars associated with each object's viewable field and/or detection area.

Figure 14:
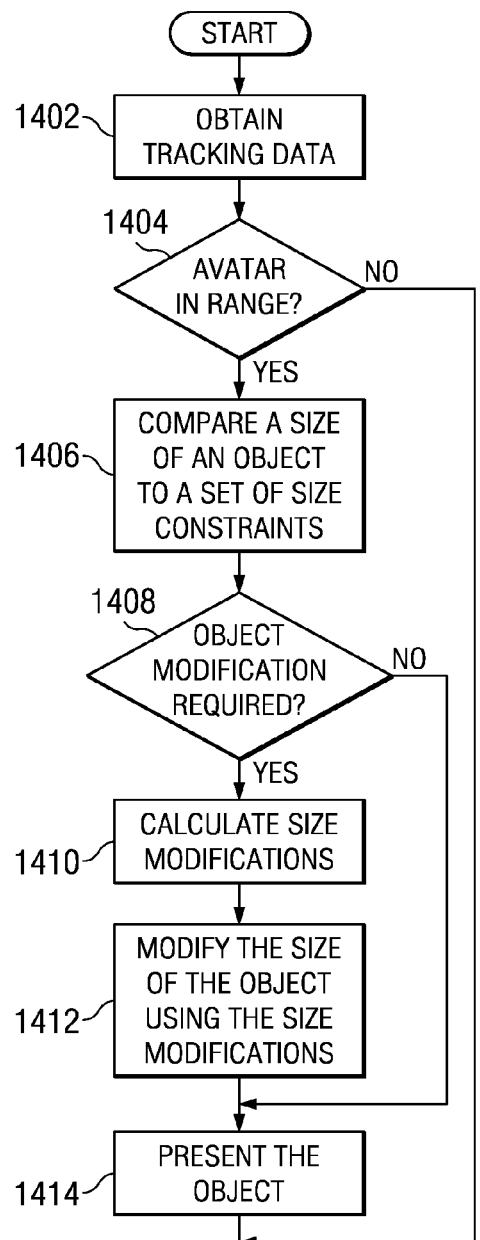
FIG. 14 is a flowchart of a process for object modification in accordance with an illustrative embodiment.

FIG. 14 is a flowchart of a process for object modification in accordance with an illustrative embodiment. The process in FIG. 14 may be implemented in a software component, such as object size controller 316 in FIG. 3.

The process begins by obtaining tracking data (step 1402). In one embodiment, an object size controller may obtain the tracking data by retrieving (or "pulling") the data from a data structure, such as object avatar rendering table 306 in FIG. 3. In another embodiment, the object size controller may receive the tracking data from another software component. For example, the tracking data may be "pushed" to the object size controller from an object based avatar tracking controller such as object based avatar tracking controller 312 in FIG. 3. Using the tracking data, the process makes the determination as to whether the avatar is in range (step 1404). If the process makes the determination that the avatar is not in range, then the process terminates.

If the process makes the determination that the process is in range of an object, then the process compares a size of the object to a set of size constraints (step 1406). Thereafter, based on the comparison, the process makes the determination as to whether object modification is required (step 1408). If the process makes the determination that object modification is required, then the process calculates size modifications (step 1410). Thereafter, the process modifies the size of the object using the size modifications (step 1412). The process then presents the object (step 1414) and terminates.

Returning now to step 1408, if the process makes the determination that object modification is not required, then the process continues to step 1414 before terminating.

Figure 15:
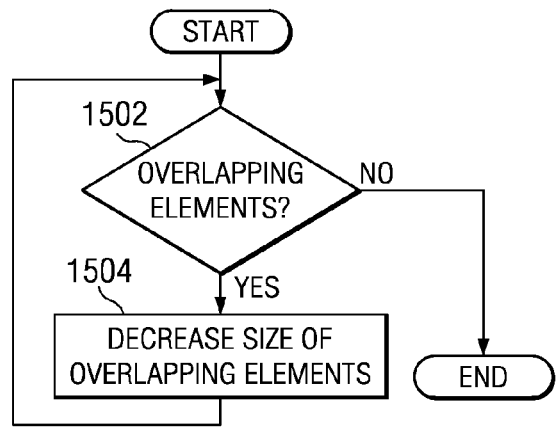
FIG. 15 is a flowchart of a process for applying size modifications to an object rendering in accordance with an illustrative embodiment.

FIG. 15 is a flowchart of a process for applying size modifications to an object rendering in accordance with an illustrative embodiment. The process in FIG. 15 may be implemented in a software component, such as object size controller 316 in FIG. 3.

The process begins by making the determination as to whether the object includes overlapping elements (step 1502). If the process makes the determination that the object does not include overlapping elements, then the process terminates. However, if the process makes the determination that the object does have overlapping elements, then the process decreases the size of the overlapping elements (step 1504) and returns to step 1502.

Figure 16:
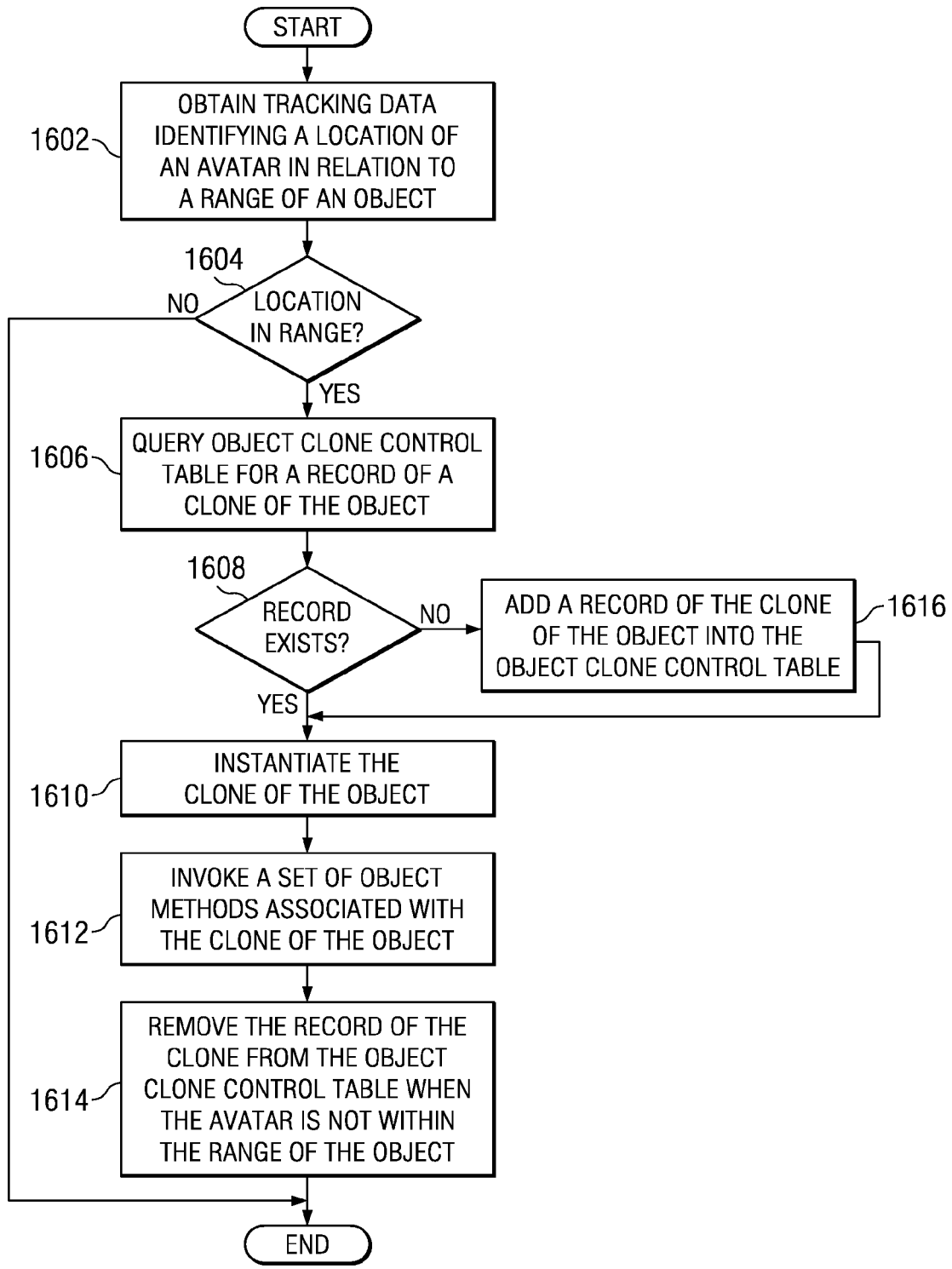
FIG. 16 is a flowchart of a process for cloning objects in a virtual universe in accordance with an illustrative embodiment.

FIG. 16 is a flowchart of a process for cloning objects in a virtual universe in accordance with an illustrative embodiment. The process in FIG. 16 is implemented in a software component, such as clone controller 328 in FIG. 3.

The process begins by obtaining tracking data identifying a location of an avatar in relation to a range of an object (step 1602). In one embodiment, a clone controller may obtain the tracking data by retrieving (or "pulling") the data from a data structure, such as object avatar rendering table 306 in FIG. 3. In another embodiment, the clone controller may receive the tracking data from another software component. For example, the tracking data may be "pushed" to the clone controller from an object based avatar tracking controller such as object based avatar tracking controller 318 in FIG. 3.

The process then makes the determination as to whether the location of the avatar is in range of the object (step 1604). If the process makes the determination that the location of the avatar is not in range, then the process terminates. However, if the process makes the determination that the location of the avatar is in range of the object, then the process queries an object clone control table for a record of a clone of the object (step 1606).

The process then makes the determination as to whether the object clone control table includes the record of the clone of the object (step 1608). If the process makes the determination that the object clone control database does include a record of the clone of the object, then the process instantiates the clone of the object (step 1610).

The process then invokes a set of object methods associated with the clone of the object (step 1612). The process removes the record of the clone from the object clone control table when the location of the avatar is not within the range of the object (step 1614) and the process terminates. The removal of the record of the clone from the object clone control table may occur upon the expiration of a predetermined amount of time. The predetermined amount of time may specify that a length of time should expire after the avatar has left the range. Thus, the invention can avoid repeatedly initiating and removing the clone if the avatar is repeatedly moving in and out of range. In an alternate embodiment, the predetermined amount of time may be null. In this embodiment, the record of the clone is removed immediately after the avatar has left the range.

Returning now to step 1608, if the process makes the determination that the object clone control table does not have a record for the clone of the object, then the process adds a record of the clone of the object to the object clone control database before proceeding to step 1610.

Figure 17:
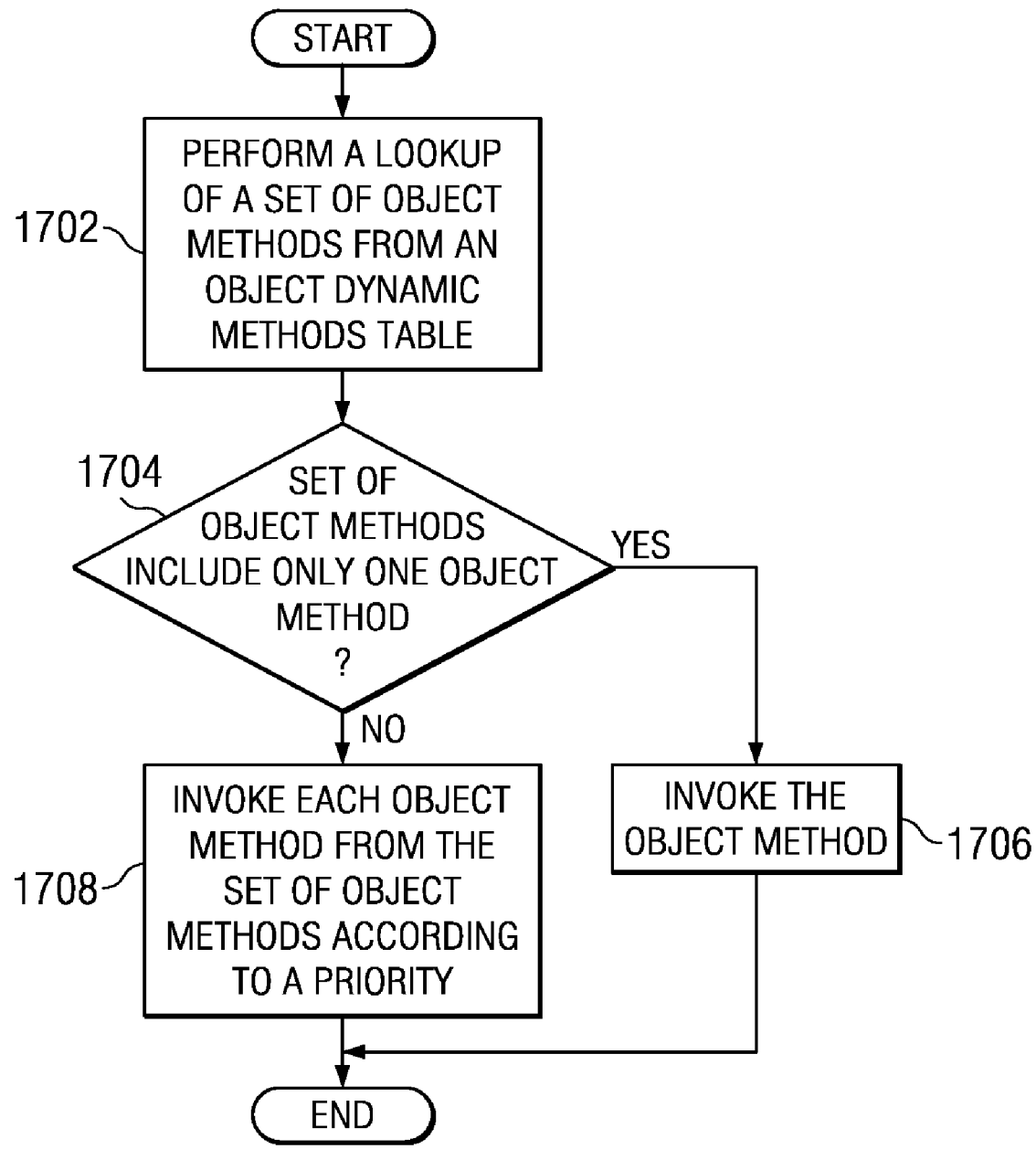
FIG. 17 is a process for invoking a set of object methods in accordance with an illustrative embodiment.

FIG. 17 is a process for invoking a set of object methods in accordance with an illustrative embodiment. The process in FIG. 17 may be implemented in a software component, such as clone controller 328 in FIG. 3.

The process begins by performing a lookup of the set of object methods from an object dynamic methods table (step 1702). The set of object methods may be found by correlating an ObjectMethodUUID field from the object clone control table with the object dynamic methods table. An example of the object clone control table is object clone control table 600 in FIG. 6. An example of the object dynamic methods table is object dynamic methods table 700 in FIG. 7.

The process then makes the determination as to whether the set of object methods includes more than one method objects (step 1704). If the process makes the determination that the set of object methods includes only one object method, then the process invokes the object method (step 1706) and terminates thereafter. However, if the process makes the determination that the set of object methods includes more than one object method, then the process invokes each object method from the set of object methods according to a priority (step 1708) and the process terminates.

Figure 18:
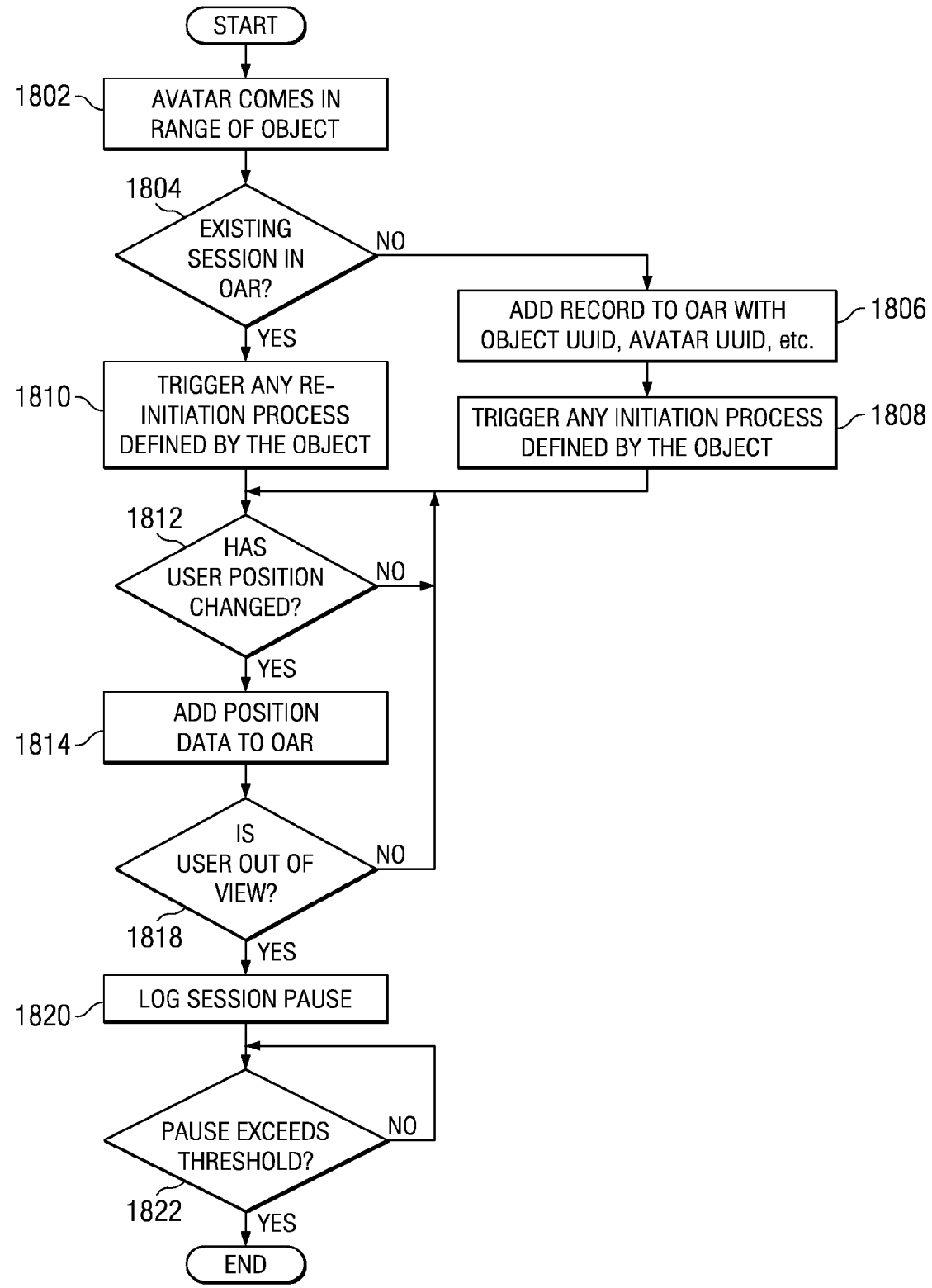
FIG. 18 is a flowchart of a process for object based avatar tracking using object avatar rendering tables in accordance with an illustrative embodiment.

FIG. 18 is a flowchart of a process for identifying a location of an avatar in relation to a range of an object in accordance with an illustrative embodiment. The process in FIG. 18 is implemented in a software component, such as object based avatar tracking controller 318 in FIG. 3.

The process begins when an avatar comes in range of the object (step 1802). A determination is made as to whether there is an existing session associated with the universally unique identifier of the object and the universally unique identifier of the avatar (step 1804). This step may be implemented by making a query to the object avatar rendering table for the object. If there is not an existing session, the process creates a record in the object avatar rendering table with the universally unique identifier of the object and the universally unique identifier of the avatar (step 1806). The record in the object avatar rendering table may include other information, such as, without limitation, a date and time, which can be used for analysis, reporting, and billing purposes.

The process triggers any object initiation process defined by the object (step 1808). For example, if a user is viewing the object for the first time and the object has a video associated with viewing the object, the process starts playing the video from the beginning.

Returning to step 1804, if a session already exists, the process triggers any object re-initiation process defined by the object (step 1810). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 1812). Changing position may include traveling, turning, or disappearing, such as teleporting, logging off, or disconnecting. If the user's position has not changed, the process returns to step 1812. The process may return to step 1812 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1812, the process adds the user position data to the object avatar rendering table (step 1814). The user position data includes the angle of view coordinate data of the avatar relative to the object and distance of the avatar to the object. The process then performs an analysis of the position data and makes a determination as to whether the user is out of view (step 1818). The user may be out of view if the user or the user's avatar has disappeared or is no longer facing the object. If the user is not out of view, after a specified amount of time the process returns to step 1812. The specified amount of time may be configured by the virtual universe grid administrator or object owner. The specified amount of time may be, without limitation, a specified number of seconds or a specified number of milliseconds.

If the user is out of view at step 1818, the process logs a session pause (step 1820). The log may include the date and time. Next, the process makes a determination as to whether the session has been paused for an amount of time that exceeds a threshold amount of time (step 1822). The threshold amount of time may be configured by a virtual universe administrator. If the pause does not exceed the threshold, the process returns to step 1822. When the pause exceeds the threshold, the process terminates thereafter.

The process termination may include, without limitation, removing the records of the avatar from the object avatar rendering table. If the record is not deleted, when the avatar comes back into range of the object at step 1802, the process will make a determination at step 1804 that an existing session associated with the universally unique identifier of the object and a universally unique identifier of the avatar already exist.

Thus, the illustrative embodiments provide a computer implemented method, apparatus, and computer program product for modifying object sizes in a virtual universe. In one embodiment, tracking data is obtained which identifies a location of a set of avatars in relation to a range of the object. The range of the object includes a viewable field. In response to determining that the object requires modification, a size of the object is compared with a set of size constraints to form a comparison. Thereafter, the size of the object is modified based on the comparison to form a set of size modifications.

Rather than presenting an unchanging object to a user controlling an avatar in a virtual universe, users may be presented with objects that may be modified based upon a set of sizing constraints and a location of the avatar in relation to the object. Modifications to sizes of the object may make the object more visible. In addition, modification of the object may make messages or visual elements presented on the object more visible. Consequently, the visibility of the object is improved thereby increasing the value of the object.

Further, clones of an object may be modified by altering the size of the object. Thus, the cloning of objects makes it possible to present a clone of an object to each avatar in the viewable area of the object to increase the visibility of the object. Cloning objects also increases the value of objects within a virtual universe because the visibility of these objects is improved.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store the program for use by or in connection with the instruction execution system, apparatus, or device.

The data storage medium can be an electronic, magnetic, optical or semiconductor system (or apparatus or device). Examples of a computer-readable data storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying an object, the method comprising the steps of:
   a computer obtaining tracking data that identifies a location of a set of avatars in relation to a range of the object, wherein the range comprises a viewable field, and wherein the location of the set of avatars is an average of distances of the set of avatars from the object;
   responsive to a determination that the object requires a modification, the computer comparing a size of the object with a set of size constraints to form a comparison; and
   the computer modifying the size of the object based on the comparison to form a set of size modifications.

2. The method of claim 1, wherein the step of the computer obtaining the tracking data comprises the step of the computer obtaining the tracking data from at least one of: a data structure storing universally unique identifiers for objects and avatars within the viewable field, and a software program that manages information describing locations of avatars in a virtual universe in relation to an object.

3. The method of claim 1, wherein the range further comprises an area adjacent to the viewable field.

4. The method of claim 1, further comprising the steps of:
   the computer applying the set of size modifications to a clone of the object to form a modified clone; and
   the computer presenting the modified clone to the set of avatars.

5. The method of claim 1, wherein the average is a weighted average based on a priority of each avatar in the set of avatars.

6. The method of claim 1, wherein the step of the computer modifying the size of the object comprises the step of:
   the computer modifying dimensions of a visual element presented on the object.

7. A computer program product for modifying an object, the computer program product comprising:
   one or more computer-readable tangible storage devices;
   program instructions, stored on at least one of the one or more storage devices, to obtain tracking data that identifies a location of a set of avatars in relation to a range of the object, wherein the range comprises a viewable field, and wherein the location of the set of avatars is an average of the distances of the set of avatars from the object;
   program instructions, stored on at least one of the one or more storage devices, to compare a size of the object with a set of size constraints to form a comparison in response to a determination that the object requires a modification; and
   program instructions, stored on at least one of the one or more storage devices, to modify the size of the object based on the comparison to form a set of size modifications.

8. The computer program product of claim 7, wherein the program instructions to obtain the tracking data comprise program instructions to obtain the tracking data from at least one of: a data structure storing universally unique identifiers for objects and avatars within the viewable field, and a software program that manages information describing locations of avatars in a virtual universe in relation to an object.

9. The computer program product of claim 7, wherein the range further comprises an area adjacent to the viewable field.

10. The computer program product of claim 7, further comprising:
    program instructions, stored on at least one of the one or more storage devices, to apply the set of size modifications to a clone of the object; and
    program instructions, stored on at least one of the one or more storage devices, to present the clone of the object to the avatar.

11. The computer program product of claim 7, wherein the average is a weighted average based on a priority of each avatar in the set of avatars.

12. The computer program product of claim 7, further comprising:
    program instructions, stored on at least one of the one or more storage devices, to modify dimensions of a visual element presented on the object.

13. An apparatus for modifying an object, the apparatus comprising:
    one or more processors, one or more computer-readable memories and one or more computer-readable tangible storage devices;
    program instructions, stored on at least one of the one or more storage devices for execution by at least one of the one or more processors via at least one of the one or more memories, to obtain tracking data that identifies a location of a set of avatars in relation to a range of the object, wherein the range comprises a viewable field, and wherein the location of the set of avatars is an average of the distances of the set of avatars from the object;
    program instructions, stored on at least one of the one or more storage devices for execution by at least one of the one or more processors via at least one of the one or more memories, responsive to a determination that the object requires a modification, to compare a size of the object with a set of size constraints to form a comparison; and
    program instructions, stored on at least one of the one or more storage devices for execution by at least one of the one or more processors via at least one of the one or more memories, to modify the size of the object based on the comparison to form a set of size modifications.

14. The apparatus of claim 13, further comprising:
    program instructions, stored on at least one of the one or more storage devices for execution by at least one of the one or more processors via at least one of the one or more memories, to apply the set of size modifications to a clone of the object to form a modified clone; and
    program instructions, stored on at least one of the one or more storage devices for execution by at least one of the one or more processors via at least one of the one or more memories, to present the modified clone of the object to the set of avatars.

15. The apparatus of claim 13, wherein the average is a weighted average based on a priority of each avatar in the set of avatars.

16. The apparatus of claim 13, further comprising:
    program instructions, stored on at least one of the one or more storage devices for execution by at least one of the one or more processors via at least one of the one or more memories, to modify dimensions of a visual element presented on the object.

* * * * *